Dec. 16, 1958 W. P. GREEN 2,864,398
DUAL ACTION HANDLES
Filed May 4, 1953
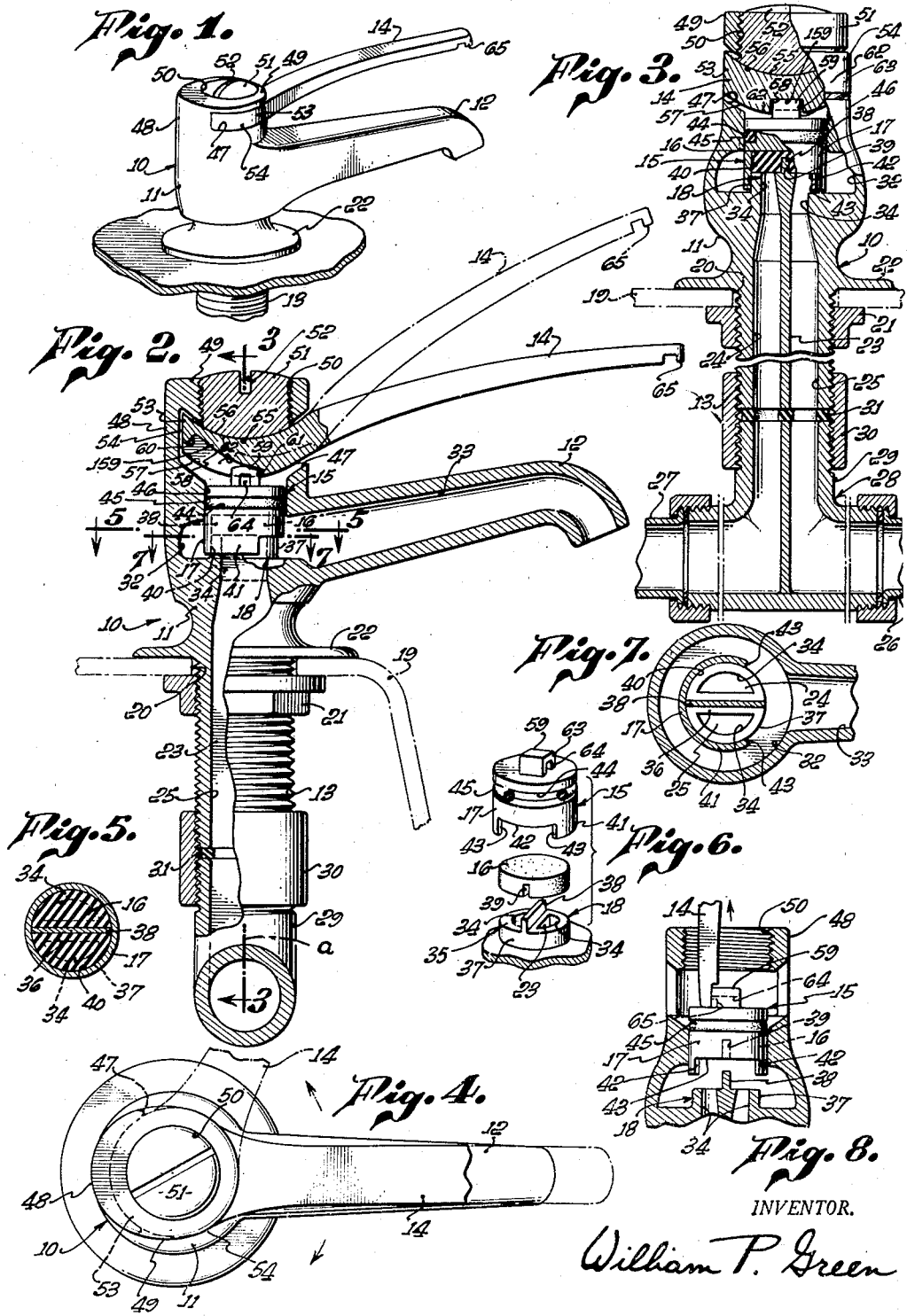
INVENTOR.
William P. Green

United States Patent Office 2,864,398
Patented Dec. 16, 1958

2,864,398

DUAL ACTION HANDLES

William P. Green, San Marino, Calif.

Application May 4, 1953, Serial No. 352,863

13 Claims. (Cl. 137—327)

This invention relates to improved control or handle structures for actuating movable elements which it is desired to both rotate about and move along an axis. The present handle structures are in certain respects particularly adapted for actuating dual movement type valve elements, as for instance those of the type shown in my copending application Serial Number 89,765, filed April 26, 1949 on Valve Structure, now Patent No. 2,639,116.

The above mentioned application discloses a novel type of hot and cold water mixing valve, including a valve unit which acts to vary the temperature of water discharged by rotary movement about an axis, and varies the total rate of discharge by movement along the axis. A major object of the present invention is to provide a handle arrangement adapted to very positively actuate a valve of this or a similar type, and which handle arrangement is adapted to effectively retain the valve in any rotary or axial position to which it may be moved. Particularly contemplated is a handle having these features, and in addition characterized by extreme structural simplicity, as well as maximum ease of assembly and disassembly. Preferably, the handle is so designed that disconnection of a single threaded element from the body of the valve frees all of the other parts of the device for complete disassembly, without the necessity for breaking any other threaded joint. Also, the device is constructed to effectively minimize wear on its parts in use, and to provide for very easy adjustment of the handle to compensate for any slight wear which may develop.

Structurally, a control or handle structure embodying the invention includes an actuating element which is interposed between the controlled unit and a backing member, and acts as a swinging or rotary wedge serving to wedge the controlled element away from the backing member. The wedging portion of the actuating element is preferably carried by an elongated manually actuable handle portion projecting outwardly from the wedging location. This handle or actuating element is mounted for rotary movement about the axis of the valve or other controlled element, and acts to turn the element about that axis. The axial wedging displacement of the valve, on the other hand, is effected by swinging of the handle about a second axis, which extends generally transversely of the main valve axis. To guide the actuating element for this second swinging movement, the actuating element and backing member have slidably engaging guide surfaces, one of which is arcuate. One and preferably both of these surfaces may be spherical, to thus very simply guide the actuating element for both of its types of swinging movement.

For wedging the valve or other controlled element away from the backing member, the controlled and actuating elements slidably engage in a pair of wedge surfaces, one or both of which converge progressively toward the above discussed arcuate or spherical guide surfaces. These wedge surfaces may be joined on an interfitting projection and recess formed on the valve unit and the actuating element, in which case the side walls of the recess and projection may serve as shoulders for transmitting rotary movement to the valve. A pair of end walls of the recess may serve as stops for normally limiting swinging movement of the handle about the transverse axis.

Most prior water valves have included a valve body, a cap threaded onto and closing the top of the body, and a valve stem extending through an opening in the cap for attachment to an actuating handle. This conventional arrangement requires the formation of two separate seals for preventing leakage of fluid from the device. Specifically, one seal must be formed between the valve body and cap, while a second seal must be formed between the cap and valve stem. A further object of the present invention is to provide a valve structure in which the necessity for two such seals is obviated, and a single seal acts by itself to prevent fluid leakage from the device.

Further contemplated is a valve arrangement in which the handle of the device is specially designed to interfit with a portion of the flow controlling unit, to serve as a pulling tool for withdrawing the unit from within the valve body.

The above and other features and objects of the present invention will be better understood from the following detailed description of the typical embodiment illustrated in the accompanying drawing, in which:

Fig. 1 is a perspective view of a hot and cold water mixing faucet embodying the invention;

Fig. 2 is an enlarged partly sectional view of the Fig. 1 faucet;

Fig. 3 is a vertical section taken on line 3—3 of Fig. 2;

Fig. 4 is a plan view of the faucet;

Fig. 5 is a horizontal section taken on line 5—5 of Fig. 2;

Fig. 6 is an exploded perspective view of the valve elements and valve seat structure of the faucet;

Fig. 7 is a section taken on line 7—7 of Fig. 2; and

Fig. 8 is a view showing the manner in which the handle of the faucet is used to pull the valve unit upwardly from within the faucet body.

Referring first to Fig. 1, the illustrated hot and cold water mixing faucet 10 includes a body 11 having the usual discharge spout 12. Both hot and cold water are introduced into the valve body through a downwardly projecting externally threaded inlet pipe 13. The discharge of water through spout 12 is controlled by a handle 14, which acts to vary the total volume of water discharged by vertical swinging movement, and varies the temperature of the discharged water by horizontal swinging movement. As best seen in Figs. 2 and 3, handle 14 controls the water discharge by actuation of a valve unit 15, including two inner and outer valve elements 16 and 17, relative to an inner valve seat structure 18.

The faucet may be mounted in conventional manner to the edge portion of a basin 19, by passing inlet pipe 13 downwardly through an opening 20 in the basin, and then tightening a nut 21 upwardly onto the inlet pipe. Such tightening of nut 21 upwardly against the underside of the mounting portion of the basin tightens flange 22 of the valve body downwardly against the upper side of the basin.

Inlet pipe 13 is interiorly divided by a diametrical partition 23 (see Fig. 3) into two inlet passages 24 and 25 for hot and cold water respectively. These two passages are connected to hot and cold water inlet lines 26 and 27 in any suitable manner, as for instance by an inverted T-shaped fitting 28 having an upwardly projecting portion 29 containing a pair of passages communicating with those of pipe 13. Portion 29 of fitting 28 is connected to pipe 13 by a double female coupling 30, which engages one of the connected parts in a right hand threaded joint, and the other part in a left hand threaded joint. To prevent water leakage between pipe 13 and fitting 28, a rubber or other gasket 31 may be provided between the parts and about the water passages.

Body 11 forms an inner chamber 32 into which hot and cold water flow separately from passages 24 and 25, and from which the mixed water flows into discharge passage 33 of spout 12. Valve seat structure 18 projects upwardly into chamber 32 and contains upper portions of the two hemispherical inlet passages 24 and 25. At its upper end, the valve seat structure contains a pair of upwardly facing semicircular openings 34 through which the hot and cold water respectively discharge into chamber 32. Extending entirely about these openings respectively, the seat structure forms a pair of valve seat surfaces, typically lying in a common horizontal plane, and each having an outer semicircular portion 35 and an inner diametrical portion 36. The semicircular portions 35 of the two valve seat surfaces are complementary, to form together an essentially circular seat. The inner diametrical portions 36 of the two valve seat surfaces are parallel.

Valve seat structure 18 has a cylindrical vertically extending outer side surface 37, relative to which the upper seat surfaces 35, 36 extend transversely. Between openings 34 and inner diametrical portions 36 of the valve seats, seat structure 18 forms a vertical upwardly projecting baffle or wall 38, which extends diametrically of cylindrical surface 37 and is of a horizontal length corresponding to the diameter of the surface.

The inner valve element 16 of valve unit 15 is essentially cylindrical and of a diameter corresponding to outer surface 37 of the seat structure, and is formed of rubber or other preferably resilient sealing material. The undersurface of element 16 extends horizonally, and is engageable with seats 35, 36 in the closed position of Figs. 2 and 3 to close off all water discharge from openings 34. Extending diametrically across its underside, element 16 contains a recess 39 of a width corresponding approximately to that of baffle 38 carried by the seat structure, and within which that baffle is telescopically received.

As will be understood, inner valve element 16 controls the total rate of water discharge from the faucet by vertical movement along the valve axis a toward and away from seat surfaces 35, 36. The outer valve element 17 varies the relative proportions of hot and cold water discharged, and thereby the temperature of the discharged water, by rotary movement about axis a. This outer valve element contains an inner essentially cylindrical recess 40 of a diameter corresponding approximately to, and alined with, seat structure surface 37, and within which inner valve element 16 is received. Element 16 is of a diameter slightly smaller than recess 40, to permit rotation of the outer element relative to the inner one.

About a portion of the circular extent of the cylindrical side wall of recess 40, preferably about substantially more than 180° and usually not less than 90°, the side wall extends downwardly beyond inner element 17, to form a depending partial cylindrical valve skirt 41 slidably engaging surface 37 of the seat structure. For the remaining portion of its circular extent, the side wall of recess 40 terminates downwardly at 42, in the plane of the undersurface of element 16. Skirt 41 terminates circularly in a pair of vertical edges 43.

Above recess 40, outer valve element 17 contains an annular groove 44, within which is received a seal ring 45 formed of a suitable sealing material. This ring, which is preferably a rubber O-ring, slidably engages a cylindrical vertical bore 46 formed in body 11, to provide a seal preventing water discharge upwardly past the valve unit.

Above bore 46, the side wall of body 11 contains a horizontally elongated opening 47 which extends about a major portion of the circular extent of the body, and through which handle 14 extends into the body. This opening is interrupted only at the rear of the body, where the body has a portion 48 extending upwardly or axially past the handle, and carrying the upper annular body portion 49 above the handle. This upper annular portion 49 of the body contains a threaded vertical or axial bore 50 of a minimum diameter at least as large as, and preferably slightly larger than, the valve unit 15 and bore 46. A plug 51 is threadedly connectable into bore 50 and acts as an adjustable backing element against which handle 14 bears upwardly. This plug may have a transverse groove 52 in its upper side for engagement by a screw driver.

Handle 14 has an enlarged dimension circular portion 53, which extends into body 11 through lateral opening 47, and which may have an external cylindrical surface 54 of a diameter corresponding to the outer surface of the adjacent upper portions of the body. The vertical extent of handle portion 53 may be sufficiently less than the vertical extent of body opening 47 to permit vertical adjustment of the handle, by adjustment of plug 51, through a substantial range.

Plug 51 has at its under side a downwardly convex spherical surface 55 whose center is located on the axis a of the valve. Portion 53 of the handle has an upper spherical surface 56 of a diameter corresponding to, and slidably engaging plug surface 55. As will be appreciated, these engaging spherical surfaces guide the handle for both horizontal swinging or rotary movement about the valve axis a, and vertical swinging movement about an axis extending transversely of axis a.

At its underside, handle portion 53 has a bottom spherical surface 57 extending parallel to upper surface 56, and at the transverse center of which is formed a recess 58, which is elongated longitudinally of handle 14. A central projection 59 of valve element 17 extends upwardly into recess 58 and engages a wedge surface 159 forming the upper wall of the recess. This wedge surface, in extending toward the rear of the faucet, converges progressively toward spherical surfaces 55 and 56, so that downward swinging movement of handle 14 acts to wedge valve elements 16 and 17 downwardly, to reduce the rate of water discharge. Upward swinging movement of the handle, on the other hand, allows the valve elements to be urged upwardly in an opening direction by the force of the water from passages 24 and 25. The upper end of projection 59 may be rounded slightly longitudinally of handle 14, for best transmission of forces between the handle and this projection. At the ends of recess 58, handle 14 forms a pair of shoulders 60 and 61, which limit the vertical swinging movement of the handle by engagement with projection 59.

The side walls 62 of recess 58 are parallel and vertical and slidably engage a pair of parallel vertical side surfaces 63 of projection 59, to transmit horizontal rotary or swinging movement from the handle to valve element 17. Preferably, the spacing of side walls 62 of the recess is very slightly greater than the width of projection 59.

In order to facilitate removal of valve unit 15 from within body 11, projection 59 desirably contains a horizontal opening 64 to be engaged by a hook tool for pulling the valve unit upwardly. The handle may be specially designed to serve as this tool, by forming the outer end of the handle of a dimension to be insertable into the body through upper bore 50, and providing on that end of the handle a transversely projecting lug or hook element 65, which is insertable into opening 64 (see Fig. 8) to pull the valve unit upwardly.

In assembling the valve, the first step is to place valve disc 16 within valve element 17, and then insert these parts as a unit downwardly through upper bore 50 of the body and into their illustrated positions of engagement with seat structure 18. Portion 53 of handle 13 may then be inserted through lateral body opening 47 into its illustrated position, in which position projection 59 is received in handle recess 58. Finally, plug 51 is screwed into the body to a condition in which the downward swinging movement of handle 14 is limited (by complete closure of the valve) in approximately the full line position of Fig. 2.

With the faucet thus assembled, the hot and cold water supplies may be turned on. Vertical swinging movement of the handle will then control the vertical displacement of valve unit 15 through engagement of wedge surface 159 with projection 59, to vary the total rate of water discharge. In the closed position of Figs. 2 and 3, element 16 of the valve unit engages the valve seat structure entirely about each of the two openings 34, to positively close off all water flow from the two inlet passages, as well as from one passage to the other. The advantages of this type of seating closure over a slide valve closure will be readily apparent.

Horizontal swinging movement of handle 14 acts to turn valve element 17 about valve axis $a$ and to thereby vary the relative proportions of hot and cold water discharged. More specifically, such rotation varies the position of skirt portion 41 of the valve element, which acts to block off the passage of water outwardly from openings 34 about a portion of the circular extent of the valve elements and seat structure. Transverse baffle 38 isolates the hot water from the cold water beneath valve element 16, that is, it prevents cross flow and intermixture of the hot and cold water, so that the skirt may be moved to a position for completely closing off either the hot or cold water, as desired, or to any intermediate position for emitting hot and cold water in desired proportions. The total rate of discharge remains the same regardless of the proportions of hot and cold water delivered, as long as the handle is not swung vertically to purposely vary the rate of discharge.

A distinct advantage of the illustrated faucet resides in the facility with which the handle may be adjusted, by merely screwing plug 51 slightly downwardly or upwardly, to vary the position of the handle in closed condition of the valve, or to compensate for any slight wear which may occur. Also highly advantageous is the fact that removal of this same plug acts by itself to free all parts of the device for disassembly, that is, it frees the handle for removal laterally from the body, after which the valve unit may be removed upwardly from the body.

I claim:

1. A valve device comprising a valve body, a fluid flow controlling valve unit in the body mounted for rotary movement about an axis and for movement in opposite axial directions along said axis relative to said body, a movable actuating unit bearing in one of said axial directions against said valve unit, a backing unit carried by the body and against which said actuating unit bears in the other axial direction, said backing unit and actuating unit having slidably engaging surfaces guiding the actuating unit for both rotary movement about said axis relative to the backing unit and body and swinging movement about generally a second axis extending transversely of said first axis, said actuating unit being free for said rotary movement about said first axis relative to said backing unit, a threaded connection between said body and backing unit mounting the latter so that rotation thereof relative to the body adjusts the backing unit and valve unit in essentially the direction of said first axis relative to the body, said actuating unit and valve unit having slidably engaging surfaces acting to wedge the valve unit axially upon said swinging movement, and means transmitting rotary movement about said first axis from said actuating unit to said valve unit.

2. A valve device as recited in claim 1 in which one of said slidably engaging surfaces of the backing unit and actuating unit is essentially spherical and centered about a point on said first axis.

3. A valve device as recited in claim 1 in which both of said slidably engaging surfaces of the backing unit and actuating unit are spherical and centered about a point on said first axis.

4. A valve device as recited in claim 1 including means forming a valve seat in said body facing essentially toward said actuating unit, said slidably engaging surfaces on said actuating unit and valve surface being shaped to wedge said valve unit axially against said seat upon said swinging movement.

5. A valve device as recited in claim 1 including means forming a valve seat in said body facing essentially toward said actuating unit, said slidably engaging surfaces on said actuating unit and valve surface being shaped to wedge said valve unit axially against said seat upon said swinging movement, both said slidably engaging surfaces of the backing unit and actuating unit being spherical and centered about a point on said first axis.

6. A mixing valve comprising a valve body containing two fluid inlet passages and a fluid outlet passage and containing a recess extending into the body from the outside thereof and communicating with said passages, a valve unit mounted in said recess for rotary movement about an axis and for axial movement therealong and acting to control the fluid flow from said inlet passages to the outlet passage, a movable actuating unit bearing in one of said axial directions against said valve unit, a backing unit carried by the body and to which forces exerted by the actuating unit in the other axial direction are applied, means guiding the actuating unit for both rotary movement about said axis relative to the backing unit and swinging movement about generally a second axis lying in a plane extending essentially transversely of the first axis, said actuating unit being free for said rotary movement about said axis relative to said backing unit, said body having threads extending about said recess, said backing unit having threads engageable with said body threads and adjustably mounting the backing unit so that rotation thereof relative to the body adjusts the backing unit and valve unit in essentially the direction of said first axis relative to the body, said actuating unit and valve unit having movably engaging surfaces acting to displace the valve unit axially upon said swinging movement, and means for transmitting rotary movement about said first axis from said actuating unit to said valve unit, there being deformable sealing material contacting a side wall of said recess and forming an essentially annular seal between said wall and said axially and rotatably movable valve unit at a location preventing fluid leakage axially outwardly past said valve unit and along said recess to the outside of the body and to said threads of the body and backing unit, said sealing material forming said seal in any of different axial and rotary positions of the valve and in any of different adjusted positions of said threads, and said recess and threads being large enough to allow removal of said valve unit outwardly through the recess and through the portion thereof about which said body threads extend, and to the outside of the body, while said wall of the recess which is engageable by said sealing material remains in the body.

7. A mixing valve as recited in claim 6, in which said side wall of the recess has a cylindrical portion, and said sealing material is carried by and axially and rotatably movable with said valve unit and essentially annularly engages said cylindrical portion of the recess wall.

8. A mixing valve as recited in claim 6, including means forming a valve seat in said body axially inwardly of said valve unit and against which said valve unit seats upon said axial movement and relative to which the actuating unit and valve unit are adjustable by said threads.

9. A mixing valve as recited in claim 6, in which said actuating unit bears axially inwardly of the recess against said valve unit, and said backing unit takes forces exerted axially outwardly by the actuating unit.

10. A mixing valve as recited in claim 6, including means forming a valve seat in said body axially inwardly of said valve unit and against which said valve unit seats upon said axial movement and relative to which the actuating unit and valve unit are adjustable by said threads, said actuating unit bearing axially inwardly toward said seat against the valve unit and applying forces axially outwardly to the backing unit, said side wall of the recess having a cylindrical portion, and said sealing material being carried by and axially and rotatably movable with said valve unit and being in essentially annular engagement with said cylindrical portion of the recess wall.

11. A mixing valve as recited in claim 6, in which said means for transmitting rotary movement to said valve unit include a non-circular portion of said valve unit projecting into a recess in said actuating unit and received in different positions in said recess as the actuating unit swings about said second axis, said non-circular portion of the valve unit having shoulders engageable with the sides of said recess in a relation transmitting rotation about said first axis from the actuating unit to the valve unit.

12. A mixing valve as recited in claim 11 in which said side wall of the recess has a cylindrical portion, and said sealing material is carried by and movable with said valve unit and annularly engages said cylindrical portion of the recess wall, there being a valve seat in said body axially inwardly of said valve unit and against which said valve unit seats.

13. A mixing valve comprising a valve body containing two fluid inlet passages and a fluid outlet passage and containing a recess extending into the body from the outside thereof and communicating with said passages, a valve unit mounted in said recess for rotary movement about an axis and for axial movement therealong and acting to control the fluid flow from said inlet passages to the outlet passage, actuating means operable to rotatably and axially move said valve unit, there being sealing material contacting a side wall of said recess and forming an essentially annular seal between said wall and said axially and rotatably movable valve unit at a location preventing fluid leakage outwardly past said valve unit and along said recess to the outside of the body, and said recess being large enough to allow removal of said valve unit outwardly therethrough to the outside of the body, said actuating means including a manually operated actuating unit having a portion interposed in the path of removal of said valve unit from the body and operable to swing in two different directions and to rotatably and axially displace said valve unit by said swinging movements, and including a backing unit removably connected to said body outwardly beyond said portion of the actuating unit and retaining said actuating unit and valve unit against axially outward movement, said backing unit and actuating unit having slidably engaging surfaces one of which is essentially spherical and which guide the actuating unit for both rotary movement relative to the backing unit about said first axis and swinging movement relative to the backing unit about generally a second axis extending transversely of said first axis, said actuating unit being free for said rotary movement about said first axis relative to said backing unit, a threaded connection between said body and backing unit mounting the latter to the former for relative adjusting movement in essentially the direction of said first axis to thereby adjust said actuating unit relative to the body, said actuating unit and valve unit having slidably engaging surfaces acting to wedge the valve unit axially upon said swinging movement about said second axis, and shoulders on said actuating unit and said valve unit acting to transmit rotary movement about said first axis from the former to the latter.

References Cited in the file of this patent

UNITED STATES PATENTS

| | | |
|---|---|---|
| 942,541 | Carlson | Dec. 7, 1909 |
| 2,556,780 | Shryock | June 12, 1951 |
| 2,609,207 | Van Sickle | Sept. 2, 1952 |
| 2,639,116 | Green | May 16, 1953 |
| 2,657,860 | Schmidt | Nov. 3, 1953 |
| 2,684,691 | Strickler | July 27, 1954 |